United States Patent [19]
Krug

[11] 3,899,061
[45] Aug. 12, 1975

[54] EXCITATION CONTROL FOR NORMALLY ENGAGED, ELECTRICALLY RELEASED MAGNETIC COUPLING

[75] Inventor: William H. Krug, Janesville, Wis.

[73] Assignee: Warner Electric Brake & Clutch Company, Beloit, Wis.

[22] Filed: Apr. 29, 1974

[21] Appl. No.: 464,741

[52] U.S. Cl............ 192/84 PM; 188/164; 192/84 A
[51] Int. Cl............................................ F16d 27/01
[58] Field of Search........ 192/84 A, 84 PM; 188/164

[56] References Cited
UNITED STATES PATENTS

| | | | |
|---|---|---|---|
| 2,765,878 | 10/1956 | Pierce | 188/164 |
| 3,055,470 | 9/1962 | Pierce | 192/84 PM X |
| 3,199,645 | 8/1965 | Henning | 188/164 |
| 3,760,917 | 9/1973 | Pagdin | 192/84 |

Primary Examiner—Allan D. Herrmann
Attorney, Agent, or Firm—Wolfe, Hubbard, Leydig, Voit & Osann, Ltd.

[57] ABSTRACT

A control for exciting the electromagnetic coil of a magnetic brake or clutch having two relatively movable parts normally physically engaged by the action of a permanent magnet in a flux path which passes through the members, but disengaged so long as a coil is excited by current to buck the magnet mmf. The control is characterized in that current through the coil is regulated according to changes in a weighted sum of feedback signals indicative of (i) coil voltage and (ii) coil current, in such fashion that exciting current tends to vary somewhat inversely with changes in the temperature of the brake or clutch, as a result of changes of coil resistance with temperature, so that the mmf of the coil is kept reliably within the "release band" of values (and the clutch or brake held released) despite not only drifting of the unregulated input voltage source, changes in coil resistance with temperature, but also — and very importantly — changes in permanent magnet mmf with temperature.

6 Claims, 6 Drawing Figures

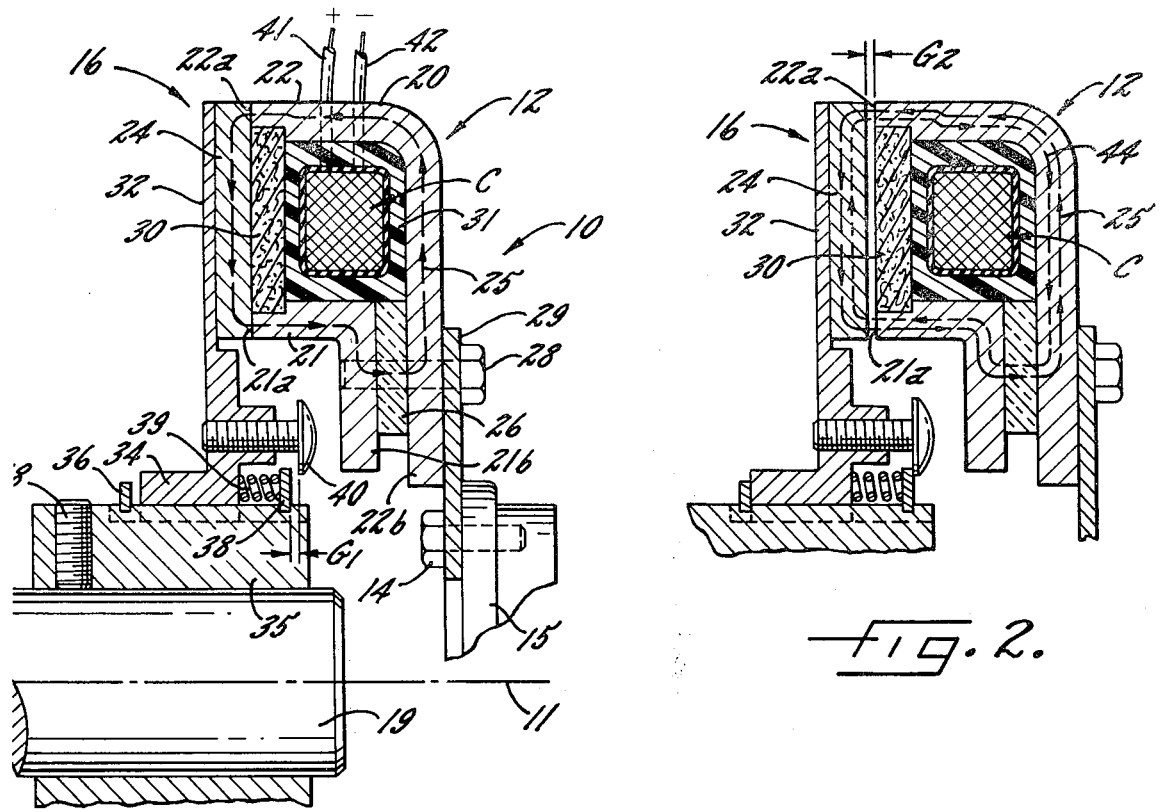
Fig. 1.
Fig. 2.
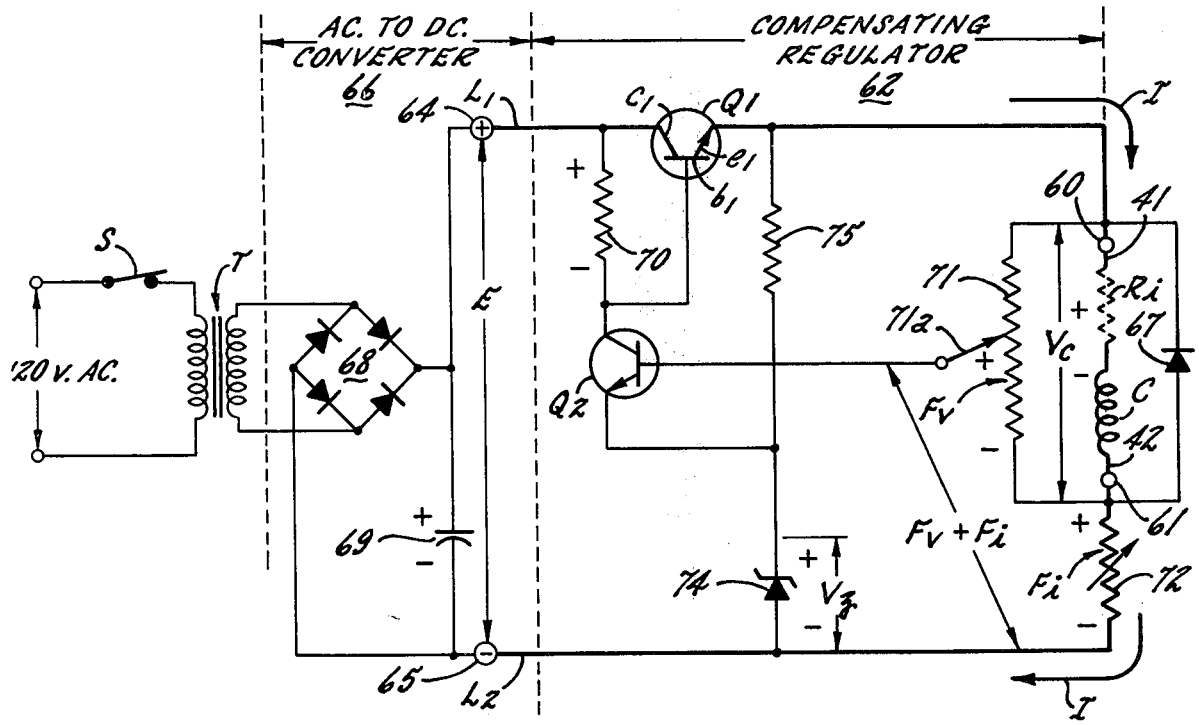
Fig. 3.

EXCITATION CONTROL FOR NORMALLY ENGAGED, ELECTRICALLY RELEASED MAGNETIC COUPLING

The present invention relates in general to coupling devices, such as clutches and brakes, which are engaged by the action of a permanent magnet and electrically released by excitation of an associated electromagnetic coil whose magnetomotive force (mmf) bucks that of the permanent magnet. The invention relates, in particular, to control systems, i.e., regulators for transmitting current to the coils of such couplings during those times and under those conditions when the couplings are to be released.

It is the general aim of the invention to assure with improved and enhanced reliability that an electrically released magnetic coupling of the type described will not spuriously engage due to changing ambient conditions under which it is operated.

More specifically, an object of the present invention is to maintain the released status of a "fail safe" magnetically actuated coupling, not only despite fluctuations in the supply of voltage from which the coil is excited, and despite changes in both coil resistance with temperature, but also despite changes in permanent magnet mmf due to variations in temperature.

It is an additional object of the present invention to overcome especially the problem of spurious engagement of electrically released magnetic couplings due to changes in the mmf of the permanent magnets because of changes in temperature.

Still another object is to achieve improved reliability of electrically released magnetic couplings by an excitation control circuit which is relatively simple and inexpensive, and thus usable, as a practical matter, in substantially all applications of such couplings.

These and other objects of the invention will become apparent as the following description proceeds, taken in conjunction with the accompanying drawings, in which:

FIG. 1 is a diagrammatic cross section of a typical electrically-released magnetic brake;

FIG. 2 is a corresponding fragmentary diagram showing the effects of two opposing mmf's when the brake is released;

FIG. 3 is a schematic circuit diagram of an exemplary control circuit for supplying excitation current to the coil of the brake, such control circuit embodying the features of the present invention;

Figure 4:
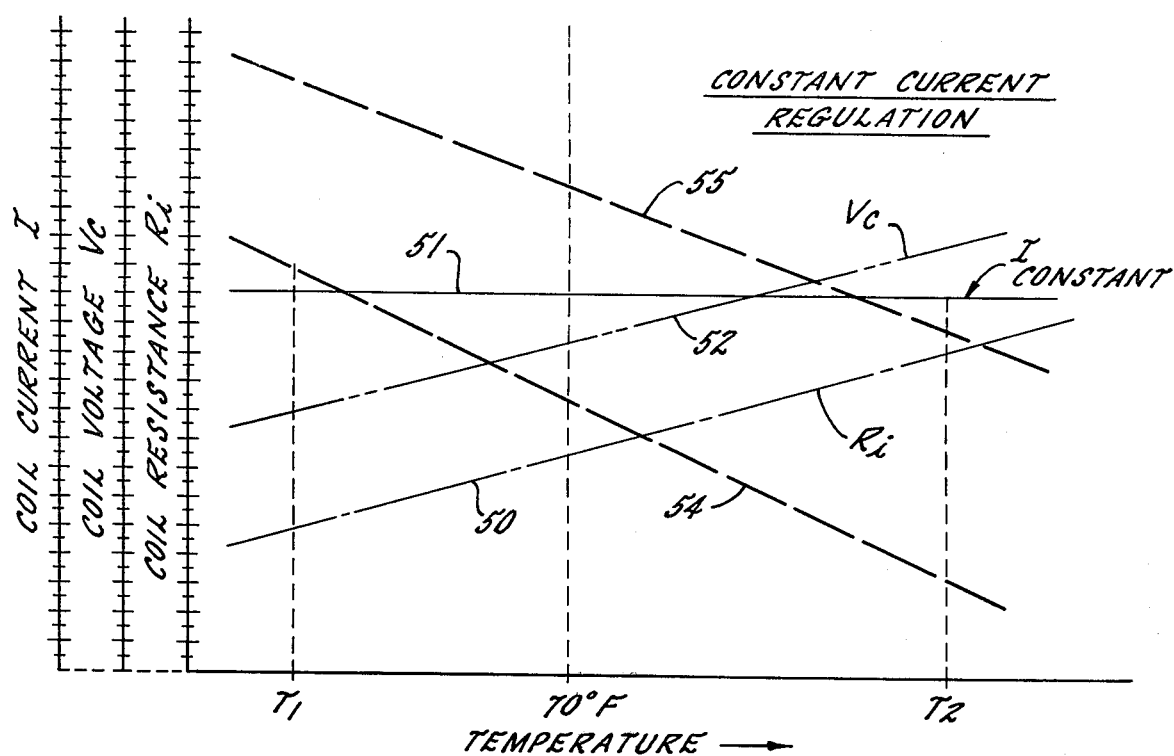
FIG. 4 is a graph illustrating in general, not rigorous, nature the variations of certain parameters with temperature when, according to prior art practice, the excitation current for the brake coil is regulated to be constant.

While the invention has been shown and will be described in some detail with reference to a particular and preferred embodiment, there is no intention that it thus be limited to such detail. On the contrary, it is intended here to cover all modifications, alternatives and equivalents falling within the spirit and scope of the invention as defined by the appended claims.

Although the invention may be applied in the control of magnetic couplings generally (i.e., either clutches or brakes) of the electrically-released type, a conventional normally engaged, electrically released brake 10 is diagrammatically shown in cross section by FIG. 1 as a concrete example to make clear the principles involved. FIG. 1 is not intended rigorously to represent the detailed construction of a commercially manufactured brake but will serve to adequately make clear the general organization and operation of such well known electrically-released magnetic couplings.

The brake 10 is annular in its general configuration and symmetrical about a center line or axis 11. Thus, the illustration of only the upper half of the brake structure will suffice. Speaking generally, the brake 10 includes a stator portion 12 adapted to be fixed, for example, by an annular ring of spaced bolts 14, to a stationary machine frame member 15; and further includes a rotor portion 16 adapted to be removably fixed, as by set screws 18, to a rotatable shaft 19, journaled by bearings (not shown) and forming a part of a machine or device which requires that the shaft be braked in a fail safe mode, i.e., braked except when electrically excited as hereinafter described.

The stator 12 includes a double-walled ring 20 of magnetic material (soft iron or steel) having a generally U-shaped cross section presenting radially spaced inner or outer pole pieces 21 and 22 concentric about the axis 11. The pole pieces terminate at their ends in pole faces 21a and 22a which are spanned by an armature ring 24 magnetically attracted thereto by flux threading a closed path 25 as the result of a permanent magnet 26 disposed in the path and here shown sandwiched between depending flanges 21b and 22b projecting radially inwardly from the pole pieces. In more detail, the two pole pieces are held together by suitable means such as a plurality of circularly spaced non-magnetic bolts 28, thereby clamping the magnet 26 rigidly in a magnetically conductive position. The permanent magnet 26 may be formed as a single ring or as a series of circumferentially spaced segments. In the non-rigorous illustration of FIG. 1 the bolts 28 serve also to mount the stator 10 on a plate 29 which is in turn fastened to the machine part 15 by the bolts 14.

To augment the frictional coupling between the armature 24 and the pole faces 21a and 22a when the brake is engaged, an insert of wear-resistant friction material 30 is disposed between the pole pieces 21, 22 so as to be flush with the pole faces. This leaves an annular cavity in which is disposed an insulated wire coil C suitably locked in place, for example, by a body 31 of hardened epoxy resin. The coil may be wound of conventional copper magnet wire with a large number of turns sufficient to produce a desired mmf when excited by flowing current of a given magnitude. The coil thus possesses considerable inductance and a not-insignificant ohmic internal resistance which is influenced by an appreciable positive temperature coefficient.

The rotor 16 includes the armature ring 24 supported by a plate-like member 32 broadened at its inner or central region to form an internally splined axial flange 34 slidable in the mating splines of a collar 35 which, in turn, is releasably locked by the screws 18 to the shaft 19. Snap rings 36 and 38, or similar elements, limit the axial movement of the flange 34 relative to the collar. Appropriate spring means (here shown diagrammatically as an annular series of compression springs 39) urge the flange 34 and the armature 24 axially to the left, tending to overcome the magnetic attraction of the armature to the pole faces as produced by flux in the path 25 from the mmf of the permanent magnet 26. When the brake is engaged by the action of such flux from the permanent magnet and the springs 39 are compressed, a gap G1 is opened between the ring 38 and the depending edge of the head of a bolt 40 adjustably screwed with an interference fit into the flange. The brake is thus normally engaged by physical frictional coupling of the rotor part 16 and the stator part 12 due to engagement of the armature 24 with the pole faces 21a, 22a and the friction material 30. But if the flux density at the pole faces is sufficiently reduced, then the springs 39 will shift the flange 34 and the armature 24 to the left, thereby opening up a small clearance gap G2 (FIG. 2), leaving the rotor and stator free to move or rotate relative to one another, i.e., releasing the brake.

The permanent magnet 26 is preferably made of ceramic material such as barium ferrite, well known in the art as having a relatively large permanent mmf for a given volume and thickness, and also as having high retentivity. Such permanent magnetic material is capable of withstanding a considerable reverse mmf without being permanently demagnetized. The magnet (or plurality of magnets, if separate segments are employed) is chosen in its size and strength so that its mmf produces a predetermined flux density (represented by the flux path 25) passing through the pole faces and the armature 24 which is sufficient to overcome the bias of the springs 39 and thus to frictionally engage the armature and the stator. Thus, the permanent magnet alone causes the two parts to be physically coupled and the brake normally to be engaged, as shown in FIG. 1. As illustrated, the magnet 26 is polarized to have north and south poles on its right and left surfaces so that the flux it produces threads the path 25 in a counterclockwise direction.

The coil C has input leads 41 and 42 brought out through the outer pole piece 22 and labeled + and − in FIG. 1. When current is passed through the coil by entry via the lead 41 and exit via the lead 42, the resulting mmf of the coil opposes or bucks that of the permanent magnet 26 and tends to produce flux threading the magnetic path in a clockwise direction, as indicated by the arrows 44 in FIG. 2. The normal excitation current is chosen with reference to the number of turns in the coil C such that the resulting ampere-turns of mmf reduce the flux density crossing between the pole faces and the armature to a sufficiently low level that the magnetic attraction of the armature is insufficient to overcome the bias of the springs 39. Thus, when the coil is excited with sufficient current, the armature ring 24 separates from the pole faces 21a, 22a and the friction material 30, opening a clearance gap (G2) to disengage the brake so that the rotor part 16 and shaft 19 may rotate freely in relation to the stator part 12.

On the other hand, if the coil C is excited with an even greater magnitude of current, then the ampere turns of coil mmf will not only weaken the counterclockwise flux from the permanent magnet and represented at 25, but will overcome the permanent magnet 26 to such an extent that appreciable coil flux will thread the path in a clockwise direction. This can attract the armature 24 to the pole faces and cause undesired engagement of the brake under what might be termed "overexcitation" conditions. Therefore, in order to hold the brake released (as is desired for lengthy periods of normal operation under various conditions), it is necessary to supply sufficient coil current to buck out the effect of the permanent magnet 26, but insufficient current to overexcite and engage the brake. Then, when the shaft 19 is to be braked, it is only necessary to completely interrupt or remove the coil excitation current, whereupon the flux produced by the permanent magnet mmf will cause engagement of the brake.

There is thus what may be termed the "release band" of current excitation values which will hold the brake disengaged, i.e., current which is sufficient to buck out the engaging effect of the permanent magnet 26 but insufficient to overexcite the coil C and engage the brake due to magnetic flux produced by the coil itself.

The obvious way to hold the brake disengaged is to connect the coil leads 41, 42 to a voltage source which is chosen, in relation to the value of the coil resistance, to produce excitation current falling within the release band. But this fails to take into account the fact that the brake will be used often in environments where the ambient temperature changes over a wide range, and also the fact that the current flow (when the brake is released) and frictional rubbing (when the brake is engaged) may cause heating and thus large temperature variations of the brake parts (including both the coil C and the permanent magnet 26). If the source voltage is chosen with a value to produce brake-releasing current through the coil when the latter is cold, that voltage may be insufficient to do so when the brake parts are extremely hot because of the greatly increased coil resistance in the latter case. Conversely, if the source voltage is chosen to have a value which produces sufficient brake-releasing current through the coil when the latter is extremely hot (and coil resistance is high), then the voltage may be so large as to cause over-excitation and spurious engagement of the brake when the coil is very cold and has a much lower resistance. Moreover, wide drifting or temporary increases or decreases in the supply voltage itself may cause coil current to fall outside the release band even in the absence of severe temperature changes.

The prior art attacked those problems by utilizing a constant current regulator interposed between the dc. voltage source and the coil, the value of the maintained constant current being chosen such that it fell approximately in the middle of the release band. In such prior art arrangements, the current through the coil would be maintained at a single, pre-established constant value irrespective of both (i) changes in coil resistance with temperature, and (ii) drifting of the input voltage from its nominal value.

Such "constant current" control is depicted by FIG. 4 which illustrates the manner in which coil resistance, coil current and coil voltage vary as the temperature of the brake components changes. The upwardly sloping line 50 in FIG. 4 indicates in generalized fashion the fact that the coil's internal resistance $R_i$ increases with temperature due to the positive temperature coefficient of resistance possessed by the wire of which the coil is formed. The line 51 of FIG. 4 indicates that the coil excitation current I is maintained at a predetermined value by a suitable constant current regulator despite changes in coil resistance or the input voltage supplied to that regulator. Thus, as indicated by the line 52 in FIG. 4, as coil temperature increases the regulator applies an increasing voltage $V_c$ to the terminals of the coil in order to keep the current I constant.

If the "release band" were defined by current values representable as upper and lower horizontal lines in FIG. 4, the constant current regulator excitation of the coil would perform its intended function over a wide range of encountered temperatures. It has been found, however, that constant current excitation of the brake coil C will not keep the brake reliably released under conditions where the temperature varies over a very wide or extreme range. The reason for this, I have found, resides in the fact that permanent magnets of electrically-released couplings are sensitive to and influenced by temperature. More specifically, I have observed that the mmf of a given permanent magnet varies perceptably with its temperature, and generally varies inversely with changes in the temperature. Consequently, as temperature of the brake parts increases, and the permanent magnet mmf decreases, the coil current (which, for a given number of coil turns produces a coil mmf proportional to current) must be maintained above a downwardly sloping lower threshold line 54 to keep the brake released; and must be maintained below the downwardly sloping upper limit line 55 to avoid over-excitation engagement. As the operating temperature of the brake changes, not only does the coil resistance change, but the release band between the lower threshold and the upper limit lines 54 and 55 also changes.

In the prior constant current regulators for exciting the brake coil, if the value of current maintained (as represented by the line 51 in FIG. 4) is the mid point of the release range at a normal room temperature of 70°F., then when the temperature decreases below a value T1, that current will be insufficient to keep the brake released because the current value becomes less than the lower threshold represented by the line 54. Conversely, if the temperature increases above a value labeled $T_2$, in FIG. 4, then the current will be greater than the upper limit represented by the line 55, and will cause engagement of the brake due to over-excitation. In either case, undesired and possibly damaging engagement of the brake will occur. Therefore, while constant current excitatiton of the brake coil is useful, and does avoid the problem which arises solely due to the temperature resistance sensitivity of the coil, it does not provide reliable release of an electrically-released magnetic coupling over a wide range of temperatures.

Figure 5:
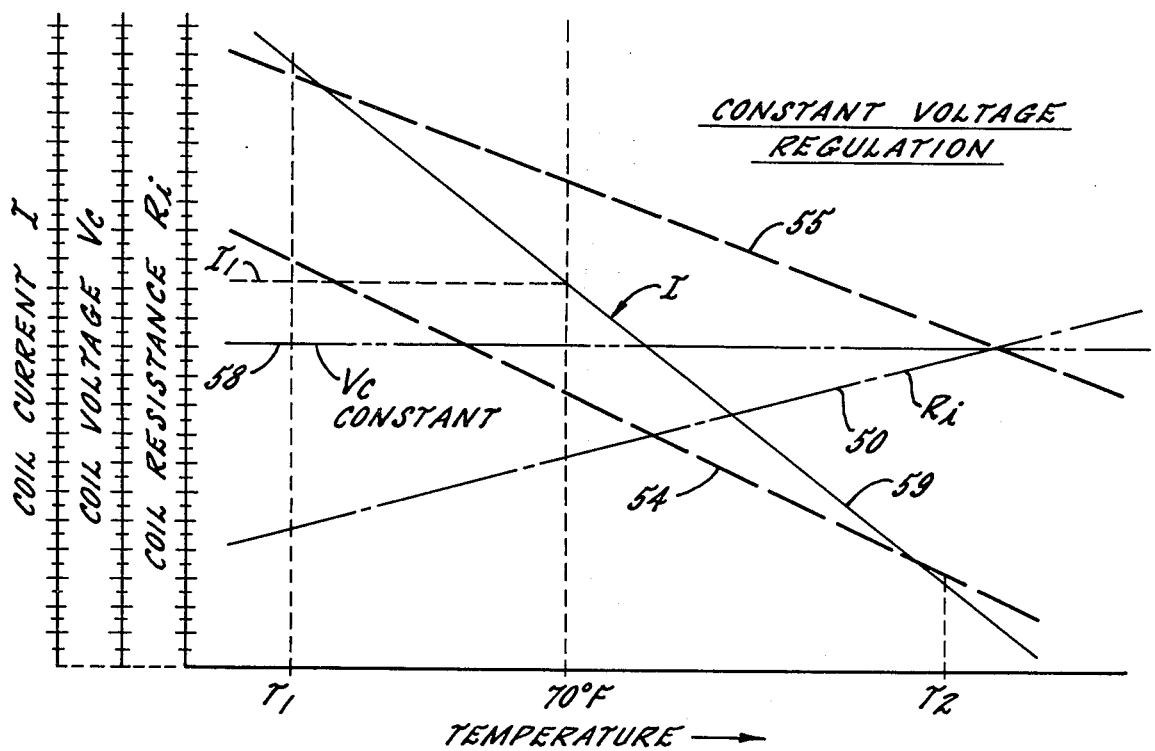
FIG. 5 is a graph similar to FIG. 4 but showing the effects of temperature changes on those parameters when the excitation voltage applied to the brake coil is held constant.

Another conventional form of power supply is a constant voltage regulator which provides an essentially constant output voltage despite drifting of an unregulated input voltage source or variations in the resistance of the energized load. FIG. 5 illustrates what would happen in the operation of an electrically-released magnetic coupling if an attempt were made to use a constant voltage regulator to excite the brake coil C as temperature varied over a wide range. Of course, the coil's internal resistance $R_1$ would vary with temperature as indicated by a line 50, just as in the case of FIG. 4, described above. Moreover, temperature changes would cause variations in the release band of current values demarked by lines 54 and 55, which are the same as shown in FIG. 4. As indicated in FIG. 5, however, a constant voltage regulator would keep the coil voltage $V_c$ constant, despite temperature or input supply voltage changes, and this is represented by a line 58. It may be assumed that the selected value of the constant voltage $V_c$ is such that with the particular value of coil resistance existing at normal room temperature of 70° F., the coil current I would have a value $I_1$ which lies midway within the release band between the lines 54 and 55. But then as temperature decreased or increased to extreme values $T_1$ or $T_2$, the internal coil resistance $R_i$ would decrease or increase, causing the current I (with constant coil voltage $V_c$) to increase or decrease along the line 59. It is apparent that above or below temperatures $T_2$ or $T_1$ the current I takes on values extremely close to or outside of the lower limit or the upper limit of the release band. Again, this may result in undesired engagement of the brake. This possibility is even stronger because normal manufacturing tolerances with regard to number of coil turns, coil resistance, exact strengths of permanent magnets, and the value of voltage maintained constant by a voltage regulator all contribute to minor departures from the relationships shown in FIG. 5. Thus, an attempt to supply brake-releasing current to the coil of an electrically released magnetic coupling from a constant voltage regulator simply will not provide sufficient reliability.

In accordance with the present invention, provision is made to keep the coil current I more reliably within the release band, and the brake assuredly released, despite temperature sensitive changes in both the resistance of the coil and the mmf of the permanent magnet. This is accomplished by regulating the current flow through the coil C as a combined function of coil current and coil voltage, the effect of the two being individually weighted, — and with the result that temperature induced changes in coil resistance are utilized to create an effect which compensates for the temperature induced changes in the permanent magnet mmf.

While regulating apparatus for carrying out the above-described combined function may take any of a variety of specific forms, a preferred embodiment is illustrated in FIG. 3. As there shown, the brake or clutch coil C has its leads 41 and 42 connected to the output terminals 60 and 61 of a compensating regulator 62 having input terminals 64 and 65. A diode 67 extending between terminals 60 and 61 is connected across the coil C and poled to oppose the flow of current I, this diode serving in known fashion to absorb the "kickback" voltage when the coil current is suddenly interrupted. An unregulated dc. input voltage E is applied to the input terminals from any suitable source, and the regulator 62 serves to keep the coil C excited with current I that holds the brake normally released. For completeness, FIG. 3 illustrates the input voltage source as an ac. to dc. converter 66 which may be connected to conventional 120 VAC mains. A switch S is interposed between the 120 volt supply lines and the primary winding of a transformer T; the secondary winding of the latter being connected to the input of a full wave rectifier shown as a diode bridge array 68. The output terminals of the rectifier are connected across a smoothing filter capacitor 69 and to the input terminals 64, 65. In this fashion, the unregulated dc. input voltage E, making lines L1 and L2 respectively positive and negative, may be given any desired nominal value such as 80 volts dc. by choice of the transformer T.

The normally closed switch S may be viewed as an emergency sensor which opens for any reason when it is necessary or desirable to deenergize the coil C and consequently engage brake 10. That switch may, for example, serve as an operator's emergency hand switch, or it may be constituted by the contacts of a relay which responds to excess speed, vibration, temperature or the like in any machine or device which incorporates the brake as a part thereof. Of course, failure of the 120 volt ac. source is tantamount of the opening switch S so that a power failure will also cause automatic engagement of the brake 10. In those situations where a suitable dc. source voltage E is readily available, it may be applied directly to the input terminals 64, 65 and the converter 66 may be omitted. Any emergency which requires engagement of the brake 10 will result in the disappearance of the dc. input voltage E.

The compensating regulator 62 utilizes a main transistor Q1, having a base $b1$, emitter $e1$ and collector $c1$, as a variable resistance in series with the brake coil C via lines L1 and L2 across the input terminals 64, 65. The collector-base-emitter path of the transistor Q1 presents a variable resistance to the flow of exciting current I in a series path (drawn in heavy lines), the value of such resistance depending upon the magnitude of current caused to flow through the $b1$-$e1$ junction. From transistor Q1, the current I flows through the coil C (whose internal and temperature-sensitive resistance is separately shown at $R_i$), thence through a current-sensing resistor 72 (shown as a variable rheostat) and back to the line L2. If other variables remain constant, an increase in the potential of the base $b1$ will increase $b1$-$e1$ current and lower the resistance which the transistor Q1 creates in the main series circuit, whereas a decrease in that potential will increase such resistance. The resistance of the collector path through the transistor Q1 may thus be called aptly a variable regulating resistance, and it is determined by the voltage drop across a resistor 70 connected in the collector-emitter curcuit of a second transistor Q2.

To create a feedback signal which varies according to changes in the voltage across the coil C, a potentiometer 71 is connected in parallel with that coil and includes an adjustable wiper 71a which may be set to vary the factor of proportionality between the coil voltage $V_c$ and the corresponding feedback voltage $f_r$ appearing between the lower end of the potentiometer and the wiper. The relationship is $F_r = K_1 V_c$, where $K_1$ is a factor of proportionality chosen by setting the wiper 71a to a particular position. To create a feedback signal which varies according to changes in the exciting current I through the coil C, the sensing resistor 72 is connected as a series element in the main current path, as described. Since the voltage drop $F_i$ across the resistor 72 is equal to the product of the resistance value and the passing current I, the signal $F_i$ is proportional to the coil exciting current by a factor of proportionality determined by the chosen or adjusted ohmic value of that resistor. The relationship is $F_i = K_2 V_c$, where $K_2$ is chosen by selecting or adjusting the value of the resistor 72.

In accordance with the present invention, the regulation of coil current is controlled according to a weighted combination of a coil voltage and current, i.e., according to the sum of the feedback signals $F_r$ and $F_i$. Those signals are combined by virtue of the resistance 72 being in series with the lower portion of the potentiometer 71 in a series circuit which includes the base-emitter path of the transistor Q2 and a Zener diode 74. The Zener diode is supplied with current in a reverse breakdown mode through a resistor 75 so that, in well known fashion, the voltage drop $V_z$ across that diode is constant and serves as a reference. In consequence, the voltage applied across the base-emitter junction of transistor Q2 is $F_i + F_r - V_z$. Since the Zener voltage $V_z$ is constant, one might say, in effect, that the base-emitter signal to transistor Q2 varies according to changes in the sum of the two feedback voltages $F_i$ and $F_r$. But since the latter are proportional to coil current I and coil voltage $V_c$, the input signal to transistor Q2 is $K_1 V_c + D_2 I$, where the weighting factors $K_1$ and $K_2$ are respectively determined by (i) the selected setting of wiper 71a and (ii) the selected value of the resistor 72.

As the base-emitter voltage and current for the transistor Q2 increases (due to an increase in either coil voltage $V_c$ or coil current I and thus an increase in the feedback voltage $F_r$ or $F_i$) the collector-emitter path of that transistor becomes more conductive, the voltage drop across the resistor 70 increases, and the potential of the base $b1$ becomes more negative in relation to the emitter $e1$. Accordingly, the effective resistance of the transistor Q1 will increase, thereby causing both the current I and the coil voltage $V_c$ to decrease. Conversely, if the coil voltage $V_c$ or the coil current I decreases, the feedback voltage $F_r$ or $F_i$ will decrease, the base-emitter voltage and current at the transistor Q2 will decrease, current flow through the resistor 70 will decrease, and the potential at the base $b1$ will become more positive to thereby reduce base-emitter current through transistor Q1. The collector-emitter resistance of transistor Q1 will thus decrease and (assuming the voltage E remains substantially constant) the current I voltage $V_c$ will be increased. The transistor Q1 is thus properly viewed as a control means operating to vary the coil current I in response to a control signal constituted by the potential at the lower end of the resistor 70. The control apparatus includes means to vary that control signal according to the weighted sum of feedback signals produced by the potentiometer 71 and the resistor 72 which sense the existing value of coil voltage $V_c$ and coil current I.

The advantageous operation of the control system shown in FIG. 3, in the face of wide temperature changes of the brake components, may best be understood from the graphs in FIG. 6, wherein lines 50, 54 and 55 represent coil resistance $R_i$, lower threshold current and upper limit current as previously described with reference to FIGS. 4 and 5. The relationships of coil current I and coil voltage $V_c$ to changing values of temperature are indicated by the lines 79 and 80, respectively. Given a particular value of coil resistance $R_i$ at a normal or standard room temperature of 70°F., the potentiometer wiper 71a and the resistor 72 in FIG. 3 are adjusted to make the coil current I fall midway between the lower and upper limits 54 and 55 in FIG. 6. Now, as temperature increases above 70°F., the coil resistance $R_i$ will increase (line 50) and this tends by itself to decrease the current I and increase the voltage $V_c$. The feedback signals $F_i$ and $F_r$ respectively tend to decrease and increase, and thus the two respectively tend to decrease and increase the series resistance presented by the transistor Q1 in FIG. 3. The net effect is that the signal $F_r$ predominates but not to the degree required for constant coil voltage to be maintained. Therefore, the current I decreases somewhat less than with constant voltage control (i.e., the negative slope of lines 79 is less than that of the line 59 in FIG. 5); and the coil voltage $V_c$ increases somewhat less than in the case of constant current control (i.e., the positive slope of the line 80 is somewhat less than that of the line 52 in FIG. 4). This all happens because of the resistance change of the coil C with temperature, but the result is that the current I decreases along the line 79 in FIG. 6 which lies substantially midway between the lower and upper limits 54, 55 which define the release band. Thus, if and when the temperature reaches the extremely high value of $T_2$, the coil current I is still at a value substantially midway between the release band boundaries (rather than outside or almost outside of those boundaries, compare FIGS. 4 and 5). With the control system of FIG. 3, therefore, the problem created by the temperature sensitivity of the permanent magnet 26, and the fact that the release band changes with temperature, is overcome by the combined feedback action of weighted signals derived by sensing coil voltage and coil current. Those feedback signals change because of change in coil resistance due to temperature variations, but they produce compensation for temperature induced changes of both coil resistance and the permanent magnet mmf.

Figure 6:
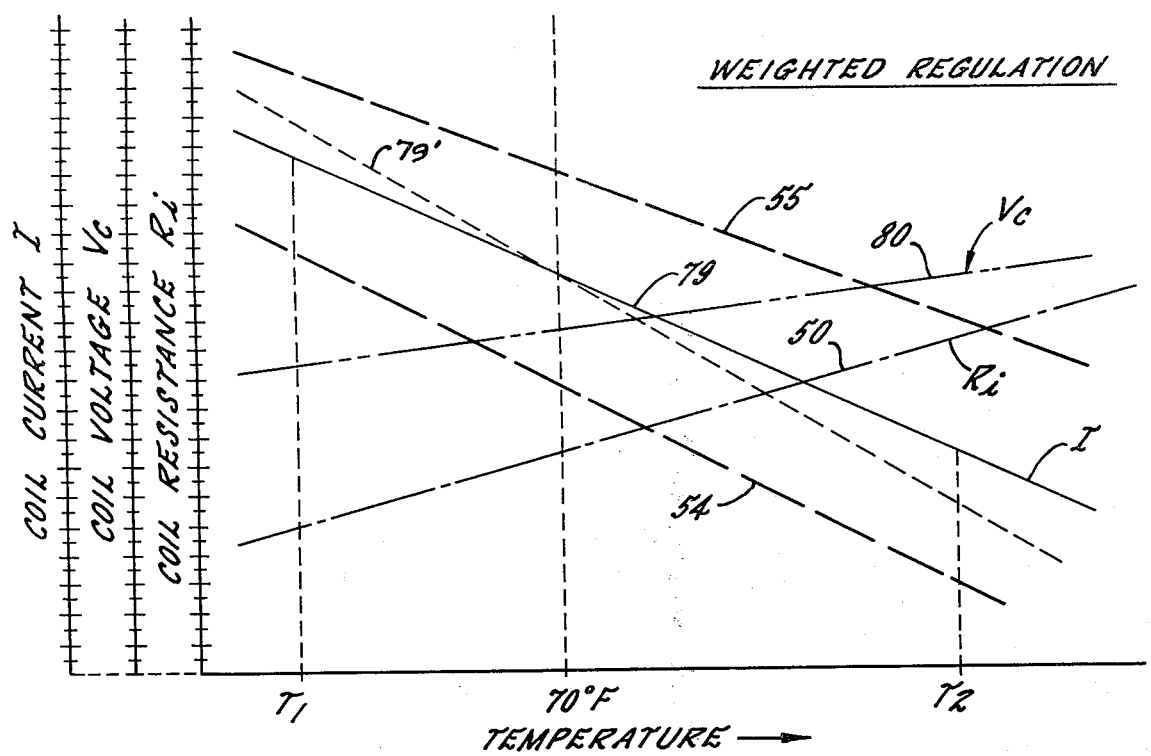
FIG. 6 is a graph illustrating the variation of the same parameters with temperature as they result from operation of the control circuit shown in FIG. 3 and according to the present invention.

On the other hand, and as indicated in FIG. 6, if the temperature of the brake parts falls from 70°F. down to an extreme low value $T_1$, the resistance $R_i$ decreases (line 50). Taken by itself, this tends to increase the current I and decrease the voltage $V_c$, so that the feedback signals $F_i$ and $F_r$ respectively tend to increase and decrease. Consequently their contribution to the control potential at the base b1 of transistor Q1 respectively tend to make the series resistance of that transistor respectively increase and decrease. The signal $F_r$ predominates, however, and the voltage $V_c$ decreases with a slope for the line 80 which is less than which would be obtained with constant current control (compare line 52 in FIG. 4). Also, the current I increases along line 79 in FIG. 6 but with a smaller negative slope compared to that which would obtain with constant voltage control compare line 59 in FIG. 5). Thus, at temperature T1, the current I is still below the upper limit 55 and indeed about midway within the release band between lines 54 and 55. The brake is reliably kept released, even at a very low temperature.

By varying the settings of the wiper 71a and the current-sensing resistor 72 (and thus by varying the weighting factors $K_1$ and $K_2$) the slope of the current vs. temperature line 79 may be changed, thereby to match that line so that it lies substantially in the middle of the release band of current values exhibited by any particular permanent magnet and coil combination. This effect is illustrated by the dotted line 79' in FIG. 5 which represents an adjusted value of $K_1$ higher than that for the line 79. It is not essential, however, that the current vs. temperature line lie exactly in the middle of the release band over the whole range of expected operating temperatures; it will suffice if such line does not cross or come appreciably close to the limits 54 and 55 at the upper and lower extremes of the temperature range to be encountered.

The control apparatus of FIG. 3 also compensates nicely for drifts or momentary changes in the unregulated input voltage E. If that voltage tends to go up or down, the current I and the coil voltage $V_c$ both tend to increase or decrease. Therefore, the signals $F_i$ and $F_r$ both tend to go up or down and thus to increase or decrease the series resistance of the transistor Q1 until substantially the original current and voltage values are restored. Thus, the present invention serves reliably to keep an electrically released magnetic coupling reliably disengaged in the face of not only (a) input voltage drifting and (b) coil resistance changes with temperature, but also (c) permanent magnet mmf changes with temperature which alter the range or band of current values required for coupling disengagement.

I claim:
1. In combination with
   a. a magnetic coupling having
      two relatively movable parts forming a magnetic flux path and attracted into physical coupling with one another when magnetic flux of a predetermined density is established in said path,
      a permanent magnet included in said path and presenting a first mmf normally establishing at least said predetermined flux density,
      a coil electromagnetically associated with said path to produce a second mmf which opposes the first, the second mmf being generally proportional to excitation current through the coil and acting, when sufficiently great, to reduce the flux density in said path enough to physically decouple said parts,
   the improvement of an excitation control having input terminals adapted for connection to an unregulated dc. voltage source and output terminals connected to said coil, and wherein said control comprises
   1. control means interposed between said input and output terminals and responsive to a control signal for varying the magnitude of current transmitted through said coil,
   2. means for sensing the voltage across said coil,
   3. means for sensing the current through said coil, and
   4. means responsive to said means (2) and (3) for applying to said control means a control signal which varies according to changes in the weighted sum of the voltage across and the current through said coil.
2. In the combination which includes
   a. a magnetic coupling having
      two relatively movable parts forming a magnetic flux path and attracted into physical coupling with one another when magnetic flux of a predetermined density is established in said path,
      a permanent magnet included in said path and having a first mmf normally establishing at least said predetermined flux density, said magnet mmf being changeable inversely with temperature changes,
      a coil electromagnetically associated with said path to produce, when excited with current, a second mmf which opposes said first mmf, said coil having an internal resistance which varies with temperature, and
   b. an excitation circuit for supplying current to said coil and including a regulator having input terminals adapted to receive an unregulated dc. input voltage and output terminals connected to said coil, the improvement wherein said regulator comprises
1. control means responsive to an input signal for varying the magnitude of current passed through said coil,
2. means for producing a first signal proportional by a first preselected factor to the voltage drop across said coil,
3. means for producing a second signal proportional by a second preselected factor to the current flow through said coil,
4. means for creating a control signal which varies substantially as the sum of said first and second signals, and
5. means for applying said control signal to said control means.

3. The apparatus set forth in claim 2, wherein said means (2) includes means for adjusting said first preselected factor to give it different values.

4. The apparatus set forth in claim 2, wherein said means (3) includes means for adjusting said second preselected factor to give it different values.

5. The combination comprising
a magnetic coupling having
two relatively movable parts forming a magnetic flux path and attracted into physical coupling with one another when magnetic flux of a predetermined density is established in said path,
a permanent magnet included in said path and normally establishing more than said predetermined flux density, said magnet having a mmf which changes with temperature,
a coil electromagnetically associated with said path to produce, when excited with current, an mmf which opposes said magnet mmf,
said coil having an internal resistance which varies with temperature,
an excitation circuit for supplying current to said coil and including
first means adapted to be interposed between a dc. voltage source and said coil and variable to change the current flowing from said source through the coil,
second means for producing a feedback signal which varies according to changes in the voltage drop across said coil,
third means for producing a feedback signal which varies according to changes in the current flow through said coil, and
fourth means for combining said two feedback signals in weighted proportions and for controlling said first means such that a change in the voltage drop across the coil varies said first means in a sense to restore the voltage drop to its original value and a change in the current through the coil varies said first means in a sense to restore the current to its original value.

6. In combination with a magnetic coupling having two relatively movable parts forming a magnetic flux path,
a permanent magnet included in said path and presenting a mmf which normally producings magnetic flux to attract said parts into physical coupling with one another, and
a coil electromagnetically associated with said path to produce, when excited with current, a mmf which opposes said magnet mmf and reduces said flux to release said physical coupling of said parts, said coil having an internal resistance which varies with changes in temperature; and
an excitation circuit having input terminals adapted to receive an input dc. voltage and output terminals connected to said coil to supply current through the latter; the improvement wherein said excitation circuit comprises
a control device connected in series between said input and output terminals and presenting a resistance which varies with changes in a control potential supplied thereto,
a potentiometer connected across said coil and having an adjustable wiper to create a first voltage signal $F_r$ proportional by a selectable factor to the voltage $V_c$ across said coil,
a resistor in series between said input and output terminals to create a second voltage signal $F_i$ proportional by a preselected factor to the current I flowing through said coil,
means for adding said first and second voltage signals in series to produce a composite signal which varies as a weighted sum of the two, and
means responsive to said composite signal for applying a correspondingly varying control potential to said control device.

* * * * *